(12) United States Patent
Tankovich et al.

(10) Patent No.: US 6,807,297 B1
(45) Date of Patent: Oct. 19, 2004

(54) COSMETIC COLOR DETERMINATE SYSTEM

(76) Inventors: Nikolai Tankovich, 9361 Stargaze Ave., San Diego, CA (US) 92129; Mahmoud Ladjevardi, 7902 Roseland Dr., La Jolla, CA (US) 92037

(*) Notice: Subject to any disclaimer, the term of this patent is extended or adjusted under 35 U.S.C. 154(b) by 0 days.

(21) Appl. No.: 10/182,306

(22) PCT Filed: Nov. 3, 2000

(86) PCT No.: PCT/US00/41879
§ 371 (c)(1),
(2), (4) Date: Jul. 23, 2002

(87) PCT Pub. No.: WO01/55956
PCT Pub. Date: Aug. 2, 2001

Related U.S. Application Data

(63) Continuation-in-part of application No. 09/493,511, filed on Jan. 28, 2000, now abandoned.
(60) Provisional application No. 60/188,339, filed on Mar. 9, 2000.

(51) Int. Cl.[7] .................................................. G06K 7/10
(52) U.S. Cl. ...................................... 382/162; 382/100
(58) Field of Search ........................ 382/100, 162–167; 356/402–405, 421–423; 132/202–203

(56) References Cited

U.S. PATENT DOCUMENTS

| | | | | |
|---|---|---|---|---|
| 4,488,245 A | | 12/1984 | Dalke et al. ................. 364/526 |
| 5,313,267 A | * | 5/1994 | MacFarlane et al. ......... 356/405 |
| 5,959,736 A | * | 9/1999 | Theuerman et al. ......... 356/402 |
| 6,000,407 A | | 12/1999 | Galazin ....................... 132/200 |
| 6,067,504 A | | 5/2000 | MacFarlane et al. ........... 702/1 |
| 6,330,341 B1 | * | 12/2001 | Macfarlane et al. ........ 382/100 |

* cited by examiner

*Primary Examiner*—Jingge Wu
(74) *Attorney, Agent, or Firm*—Rutan & Tucker

(57) ABSTRACT

A collector (202) captures light from source images as a field of pixels, a color analyzer (292) analyzes a proper subset (420) of the field to produce a plurality of color values, and a cosmetic analyzer then uses the color values to produce a cosmetic color determination. Another aspect of the present invention comprises a window having a light passage area, a color calibration region that is not coextensive with the light passage area, and a detectable product identification region. The window may also contain a mechanism that tends to preclude multiple uses. A third aspect of the present invention is a system that combines the collector, the color analyzer, the cosmetic analyzer, and window.

12 Claims, 2 Drawing Sheets

COSMETIC COLOR DETERMINATE SYSTEM

This application is a 371 of PCT/US00/41879 filed Nov. 3, 2000, which is a continuation-in-part of Ser. No. 09/493,511 filed Jan. 28, 2000 now abandoned, and claims benefit of 60/188,339 filed Mar. 9, 2000.

FIELD OF THE INVENTION

The field of the invention is cosmetic color determination systems.

BACKGROUND OF THE INVENTION

Systems of skin color determination are known for medical purposes. Systems such as that proposed by U.S. Pat. No. 5,671,735 to Chromatics Color Sciences International, Inc. (May 1994), the disclosure of which is incorporated by reference in its entirety, attempt to use change in color to detect the presence of a medical condition. Abrupt changes in skin color are of particular concern. For example, a rapid change in skin color that exceeds a normal standard may indicate the presence of cancer.

Another system designed for medical applications is proposed by U.S. Pat. No. 4,723,554 to Massachusetts Institute of Technology (August 1986), the disclosure of which is incorporated by reference in its entirety. That system uses an infrared reflectance device to evaluate skin pallor. Such a system may be particularly valuable to indicate the onset of shock, jaundice, or other conditions.

Both of the systems described above illustrate the importance for accurate color determination systems in the medical field. Such medical systems typically derive their accuracy from a detailed analysis of an area of skin afforded by careful examination of small subsets or pixels of an area.

Systems of skin color determination are known for cosmetic purposes. However, with cosmetic systems, the need for accuracy is much less obvious. Color determination systems often attempt to match a cosmetic hair color or facial makeup with a person's appearance in an attempt to enhance the person's appearance. Early systems of analysis were performed by a person without the aid of a machine. When a person relies on his eyesight to perform a visual analysis, the results are often inadequate in comparison to the analysis done with the aid of a machine.

Machines are known to analyze a person's hair, skin, or nail color for cosmetic purposes. However, to the best of our knowledge, such machines always capture an area of the body, and make a color determination based on an average of the whole area. Such a system seems reasonable at first glance because of the nature of cosmetics—a single color is spread of an entire area of skin or applied to all of a person's hair.

FIG. 1 shows a schematic of data reduction in a prior art cosmetic color analyzing system 100 in which data from a field of pixels 110 is summarized into RBG values 122 for the entire field 110, and then the RGB values 122 are interpreted as a cosmetic color 130.

Surprisingly, real world experience demonstrates the cosmetic color determined by such systems is frequently inaccurate because the system fails to do more than provide an average over the entire captured field. For example, a system of color determination may examine the hair of two people. One person may have one hundred per cent dark blonde hair. The other person may have half black hair and half gray (white) hair. A current system of cosmetic color determination may point to a dark blonde color for both people. Such a color determination is flawed because the hair colors of each person are entirely different. Thus a need exists for improved systems of cosmetic color determination.

SUMMARY OF THE INVENTION

One aspect of the present invention provides systems and methods in which a collector captures light as a field of pixels, a color analyzer analyzes a proper subset of the field to produce a plurality of color values, and a cosmetic analyzer uses the color values to produce a cosmetic color determination.

Another aspect of the present invention comprises a window having a light passage area, a color calibration region that is not coextensive with the light passage area, and a detectable product identification region. In a particular embodiment, the window, in addition to allowing the passage of light, has at least two other functions. The first function is to provide a color calibration region. The second function of the window is to provide a product identification region. In one aspect, the product identification region may be in the form of a trademark or other logo having a chemical that reacts to light.

A third aspect of the present invention is a system or method that combines the collector, the color analyzer, the cosmetic analyzer, and the window. Especially contemplated windows are preferred to be removably coupled to a housing comprising the collector. Such windows may interact with the collector to calibrate the color before every capture of light. The system of this aspect is designed to encourage hygiene by requiring an operator of the collector to change the window in response to a detectable chemical reaction.

Various objects, features, aspects and advantages of the present invention will become more apparent from the following detailed description of preferred embodiments of the invention, along with the accompanying drawings in which like numerals represent like components.

DETAILED DESCRIPTION

Figure 2:
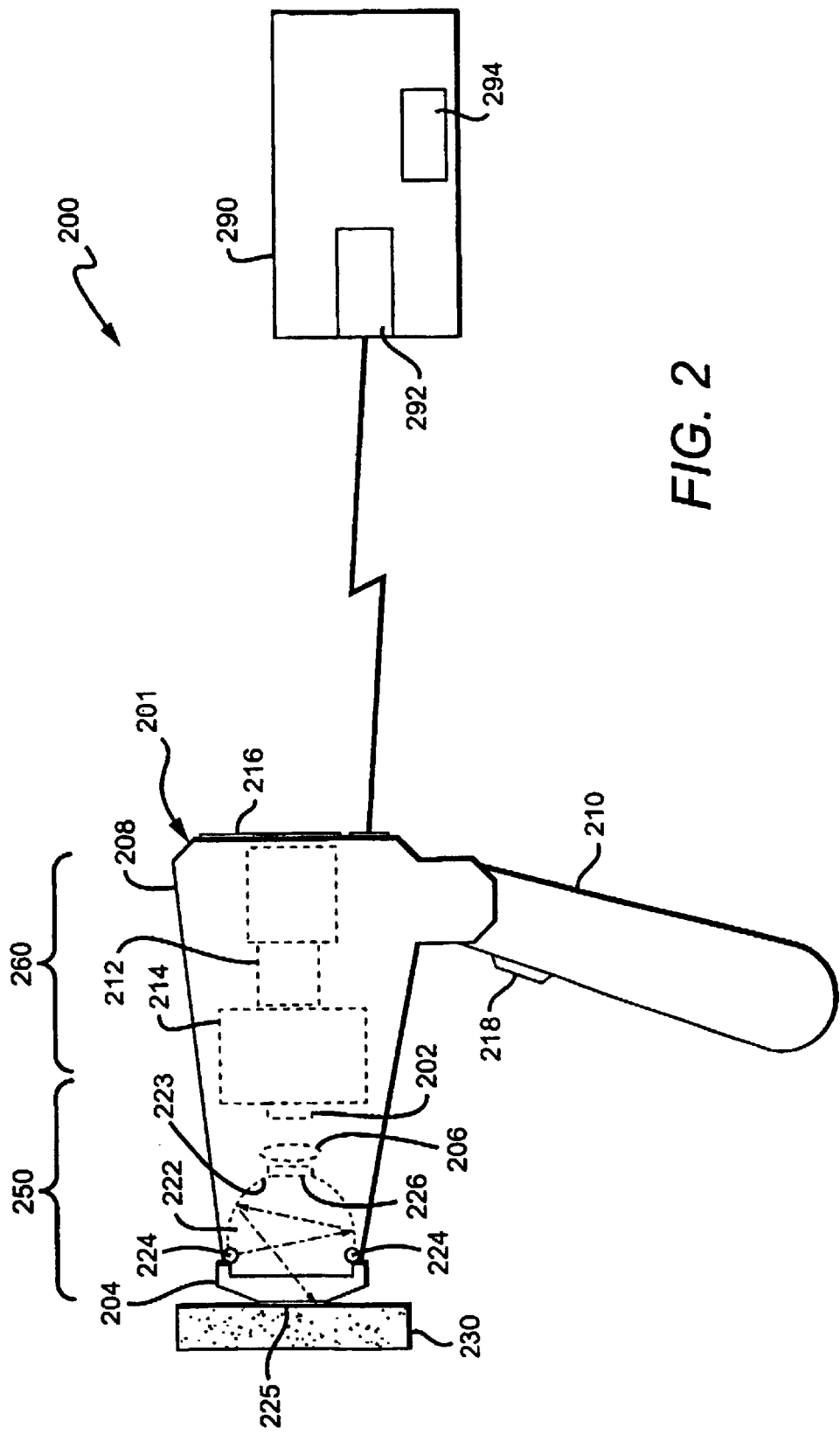
FIG. 2 is a schematic of a cosmetic color analyzing system according to an aspect of the present invention.

In FIG. 2, a cosmetic color determination system 200 generally comprises a pixel capture device 201 having a collector 202, a removable window 204, and an external data processing unit 290 having a color analyzer 292 and a cosmetic analyzer 294.

The pixel capture device 201 is basically a digital camera having a lens 206 and a collector 202. Suitable cameras are still cameras, video cameras, or some combination of the two. The general shape of the pixel capture device 201 can thus be any of numerous well known camera shapes, or any other shape that can accommodate the camera functions. The housing 208 can be made from any suitable material or materials, including metals, impact resistant plastics, and so forth. In the preferred embodiment, the handle 210 can be foldable making for ease of transportation and storage. In FIG. 2 the general design of the pixel capture device 201 makes it suitable for placing near the surface of the human body, in particular near the skin of the face and hair on the head.

In general, the pixel capture device 201 may be viewed as comprising a proximal portion 250 to be placed in immediate proximity to the hair or the skin being analyzed, and a distal portion 260 that provide a viewing port 216 (display) for the operator (not shown).

The collector 202 is any device that can capture and digitize light as a field of pixels. In a video camera type system, the collector 202 would comprise a CCD, CMOS, or other color image microchip capable of producing electrical signals representing intensity levels of individual colors for every pixel of the captured image.

The signals from the collector 202 may be converted into a video data stream by an electronic board 214 having video-capture electronics (not shown). The data stream can be transmitted by a wireless modem 212 to the data processing unit 290. The electronic board 214 may also provide the necessary means for displaying an image onto the screen of the display 216.

The Disposable Window

Figure 1:
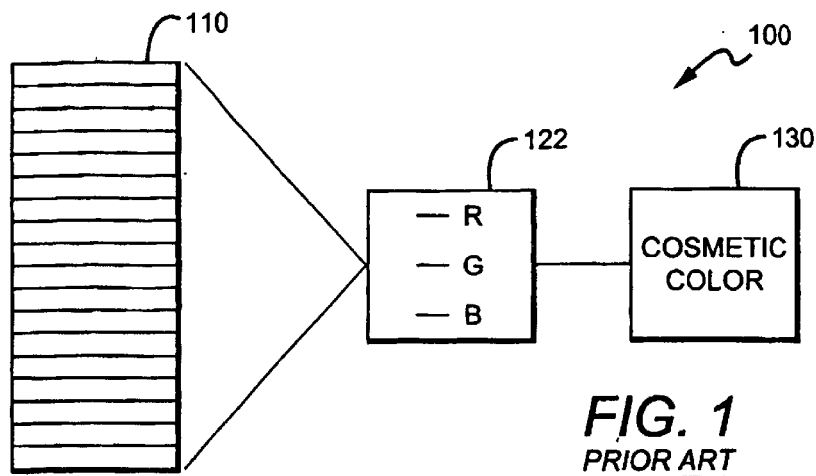
FIG. 1 is a schematic of data reduction according a prior art cosmetic color analyzing system.
Figure 3:
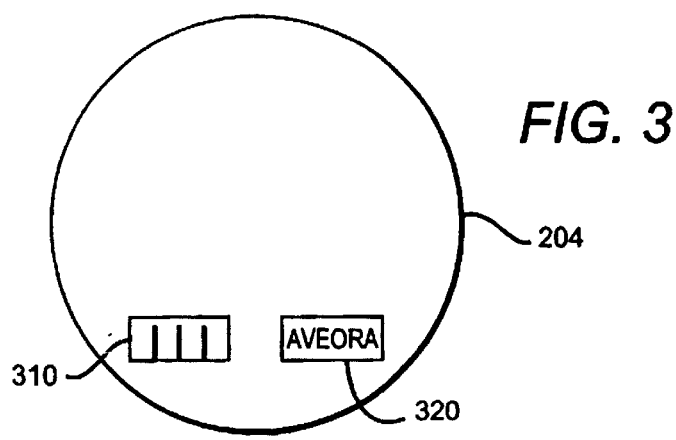
FIG. 3 is a window according to an aspect of the present invention.

In FIG. 3, the window 204 comprises a color calibration region 310 and a product identification region 320. The window 204 is preferably removably attachable to the proximal end of the pixel capture device 201.

One function of the disposable window 204 may be to improve the accuracy of the collector 202, color analyzer 292, or some other device by providing a color calibration region 310 that can be used for calibration. While calibration may be realizable for any component, calibration is typically performed for the image collector 202 or the color analyzer 292.

The process of calibration preferably comprises the image collector 202 capturing at least one standardized sample of color from the calibration region 310. From the sample of color, the image collector 202 calculates a resultant measurement. The image collector 202 may then be calibrated based on a calculation that includes a comparison between the resultant measurement and a predetermined measurement. Calibration of the image collector 202 or other device preferably occurs before every capture of the source image (person) 230.

In a particularly contemplated embodiment, the calibration region 310 may take the form of a trademark 40 or other logo. For example, each letter of a trademark 40 may be represented in one of several standardized colors. The image collector 202 may use the letters of the trademark as the standardized samples of color with which to perform the calibration.

A second function of the disposable window may be to encourage hygiene. Often the window 204 will come in contact with a person's face or hair, and the possibility exists that the window 204 may become dirty or otherwise contaminated. Simple cleaning of the window may be insufficient to remove the dirt or contamination. Further, the operator (not shown) of the system may forget to clean or replace the window.

One mechanism for ensuring that the window is relatively clean is to prohibit or otherwise discourage or limit the proper functioning of the color determination system unless a used window is replaced with a new window. Replacement may be facilitated by providing a subsystem that prohibits an image capture unless color calibration occurs first. In a preferable subsystem, the window 204 may contain a light sensitive chemical (not shown) that is released over time. The release of the chemical may interfere with calibration, and therefore prohibit image capture until the used window can be replaced with a new window. While this embodiment contemplates interference of the color calibration operation, the interference may be of any aspect of the system, including the field being captured. In addition to light sensitive chemicals, it is also contemplated to utilized chemicals that react with air, heat, electrical current, or any other factor or event.

In another embodiment, capture of an image 230 of a person's skin or hair is preferably preceded by detection of a trademark 40 or other logo within the window 204. A chemical may be released over time that prohibits detection of the trademark 40, and therefore, effectively prohibits capture of the person's image 230.

The Capture of Light

An image capture process is typically initiated when an operator presses an image capture button 218. In response to the pressing of the image capture button 218, an illuminator 222 illuminates the field being imaged, preferably with a diffuse, uniform and glare free illumination. These features can be important in providing reliable and repeatable measurements, and tend to become more important where the source is shiny or otherwise reflective.

In preferred embodiments, the illuminator 222 is of an integrating sphere type, and comprises a reflector 223, a plurality of light sources 224, an input aperature 225, and a camera aperature 226. The surface of the reflector 223 preferably scatters the impinging light in a diffuse manner having at least approximately Lambertian scattering characteristics.

The light source 224 can comprise any suitable light emitting device or devices. Most preferred are a plurality of light emitting diodes (LEDs) that provide adequate intensity and spectral composition of illumination for the measurement purposes. A purpose of the reflector 223 is to homogenize the illumination produced by discrete light sources such LEDs. In a preferred embodiment, the LEDs emit broad band (white) light comprising spectral components from substantially the entire visible portion of the electromagnetic spectrum. Such visual portion preferably includes wavelengths between 400 and 700 nanometers.

It is advantageous for the emitted light to undergo diffuse single or multiple scattering before it emerges from the input aperture 225 and interacts with the skin 230, hair, or other surface under examination. An especially preferred embodiment includes a light system that accepts feedback about the image before capturing the image. Such an embodiment may, for example, automatically determine that the image being captured is skin rather than hair, and adjust the particular combination of light sources or collector sensitivity being used to accommodate skin. For example, imaging skin colors may utilize diodes that contain relatively equal amounts of red, green, and blue light while imaging hair may use diodes that emit relatively more blue than green and red light. Other contemplated feedback may be advantageously utilized to accommodate different skin colors or hair colors. Dark colored skin, for example, may be preferably imaged using a higher intensity of light than light colored skin.

Light reflected by the skin 230 preferably passes from the input aperature 225 to the camera aperature 226 and enters the video system. The infrared portion of the light may be removed by a filter (not shown) disposed near the camera aperature 226.

The Data Processing Unit

The data processing unit 290 may be any electronic device capable of performing programmed instructions, but it is preferably a computer having a color analyzer 292 and a cosmetic analyzer 294. In a particular embodiment, the data processing unit may be located within a salon type setting and programmed to accept data from a plurality of pixel capture devices operated by cosmeticians or other workers around the salon.

The color analyzer 292 may be any device that is capable of analyzing the video data stream produced by the pixel capture device 201. The color analyzer 292 preferably has the ability to perform an analysis of subsets of pixels that have been captured as reflective light. The analysis preferably results in RGB (red, green, blue) or other values that will be used by the cosmetic analyzer 294.

The cosmetic analyzer 294 is any device that is capable of analyzing the values produced by the color analyzer 292. Both the color analyzer 292 and cosmetic analyzer 294 are preferably embodied in software, and may well be executed on the same computer or other physical device. The output of the cosmetic analyzer 294 is generally a cosmetic color such as, platinum blonde, copper red, medium brown, ash brown or other color description.

Pixel Analysis

Figure 4:
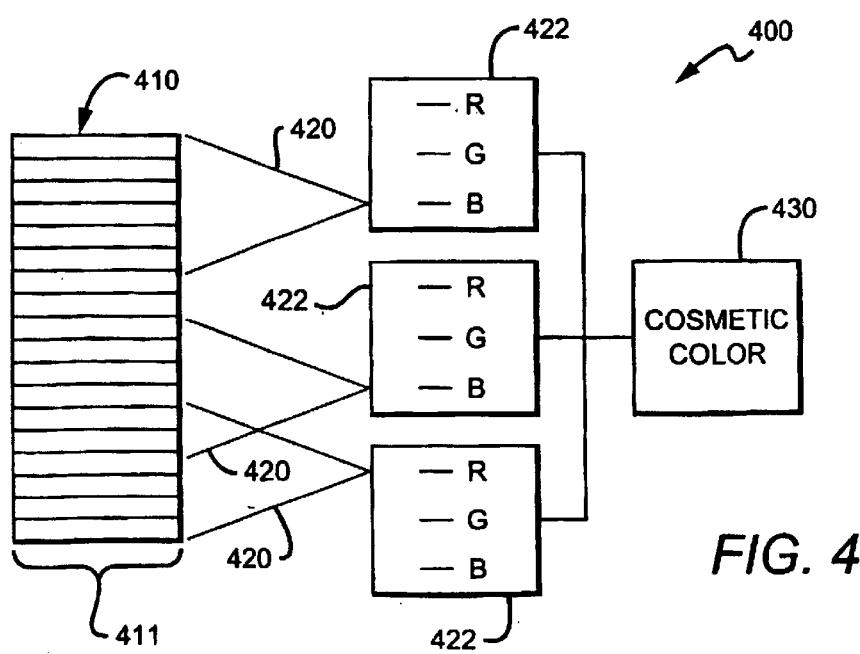
FIG. 4 is a schematic of data reduction according to an aspect of the present invention.

In FIG. 4, a schematic of data reduction in a cosmetic color analyzing system 400 shows data from a field of pixels 410 being summarized into RBG values 422 for each of a plurality of proper subsets 420 of the field 410, and then the various RGB values 422 being interpreted as a cosmetic color 430.

As used herein, the term "proper subsets" means any subset less than the entire set. Thus, if the field 410 of pixels 411 contains 1,000,000 pixels, a proper subset may be any number of pixels in the field 410 other than all of the pixels. A system may, for example, split up a $10^6$ pixel field 410 into $10^1$, $10^2$, $10^3$, $10^4$, or $10^5$ proper subsets.

A related concept is "nontrivial subsets" of pixels, which term is used herein to mean a proper subset that is also more than a single pixel. Preferred subsets 420 contain anywhere from 2 to 100 pixels, more preferably from 5 to 50 pixels, and even more preferably from 10 to 25 pixels. All ranges set forth herein are deemed to be inclusive unless expressly defined otherwise.

The field 410 is generally derived from an image of an external portion of a person's body such as skin, hair or nails, but the field may be derived from any source that is captured for determination of a cosmetic color. In a preferable system, the field is derived from a small area of a person's cheek or other area of the face.

Data characterizing the field 410 of pixels 411 is preferably communicated to the data processing unit 290 or other device capable of performing an analysis of the pixels. In a preferred embodiment, the data processing unit 290 is external to the pixel capture device 201, and the data is communicated via cable (not shown) or wireless modem 212. In other embodiments it is contemplated that one or more aspects of the data processing unit could be included in the pixel capture device.

Thus, specific embodiments and applications of cosmetic color determination systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A system comprising:
   a collector that captures light as a field of pixels from a single positioning of the collector that reflect off of a three dimensional object;
   a color analyzer that uses data from the pixels to produce a plurality of color values for each of a plurality of proper subsets of the pixels in the field; and
   a cosmetic analyzer that combines the plurality of color values from the subsets to produce a cosmetic color determination.

2. The system of claim 1 wherein the plurality of proper subsets comprises more than 10 proper subsets.

3. The system of claim 1 wherein the plurality of proper subsets comprises more than $10^2$ proper subsets.

4. The system of claim 1 wherein the plurality of proper subsets comprises more than $10^3$ proper subsets.

5. The system of claim 1 wherein the collector comprises a camera.

6. The system of claim 1 wherein the collector comprises a video camera.

7. The system of claim 3 wherein the collector comprises a plurality of light emitting diodes that emit broad band light.

8. The system of claim 3 wherein the light includes a wavelength between 400 nanometers and 1000 nanometers.

9. The system of claim 3 wherein the system further comprises a housing that includes the collector and a wireless modem 212.

10. The system of claim 3 wherein the cosmetic color determination comprises a numeric value.

11. The system of claim 3 wherein the cosmetic color determination comprises a non-numeric value.

12. A system comprising:
   a collector that captures light as a field of pixels;
   a color analyzer that uses data from the pixels to produce a plurality of color values for each of a plurality of proper subsets of the field;
   a cosmetic analyzer that combines the plurality of color values from the subsets to produce a cosmetic color determination; and
   a window, removably coupled to the collector, through which the captured light passes, comprising a light passage area having (i) a color calibration region that is not coextensive with the light passage area; and (ii) a visually detectable product identification region.

* * * * *